Oct. 28, 1930.     E. G. GOODELL     1,779,535
PROCESS OF TREATING BLACK LIQUORS
Filed Dec. 31, 1928
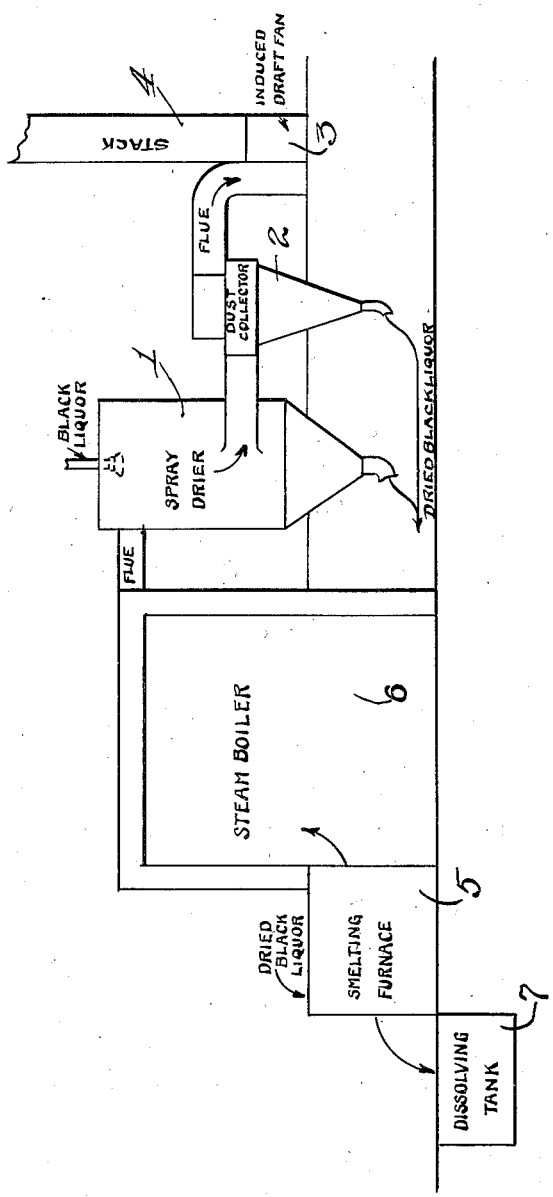
Inventor
Edward G. Goodell Patented Oct. 28, 1930

1,779,535

UNITED STATES PATENT OFFICE

EDWARD G. GOODELL, OF STEVENS POINT, WISCONSIN

PROCESS OF TREATING BLACK LIQUORS    REISSUED

Application filed December 31, 1928. Serial No. 329,385.

This invention relates to a process of treating black liquors and is more particularly directed to the regeneration of black liquors as obtained in the soda and sulphate processes for the manufacture of pulp.

According to both the sulphate and soda process for making pulp, the wood chips are cooked by steam under pressure in an alkaline cooking liquor composed, in the case of the sulphate process, mainly of sodium sulphide, sodium hydroxide, and lesser quantities of sodium carbonate and sodium sulphate, and in the case of the soda process, composed principally of sodium hydroxide with relatively smaller quantities of sodium carbonate but no sulphur compound. In certain cases, a combination or modification of both of the processes is employed.

In any alkaline cooking process, however, the resulting spent liquors, as separated from the pulp after cooking are commonly referred to as "black liquor" and it is to the processes of recovery or regeneration of the alkali or inorganic content of said black liquors and the utilization of the heat values therein contained that this invention is particularly directed.

Various methods are at present employed to recover the alkali values contained in these black liquors. The successive steps usually include a draining or filtering of the black liquors from the cooked pulp and a concentrating of the black liquor in vacuum or direct heat disc evaporators, or both, this step usually concentrating the black liquors from about 12° Bé. to about 35° Bé. at which latter consistency the partially concentrated black liquors are fed into a rotary incinerator, the heavy black liquor is further dried and partly burned to a variable consistency, ranging from a heavy syrup to a solid ash or burning coal and in such condition is commonly referred to as "black ash." This black ash is fed continuously into a smelting furnace, or smelting furnaces, where it is burned, and from which the heat of combustion of the organic constituents remaining in the black ash passes to the incinerator.

In the regeneration of the black liquors from the sulphate process, an addition of sodium sulphate to replace the losses in the recovery cycle is made usually to the black ash as it goes to the smelting furnaces, where the sodium sulphate thus added and the sodium sulphate content of the black liquors is more or less completely reduced to sodium sulphide, which in the sulphate process is an active cooking agent. The final product from the smelting furnaces is melted and run out into a dissolving tank, from which the solution is pumped to mixing and causticizing tanks, filters and the like, where the final steps in the preparation of the recovered liquors for re-use in cooking pulp takes place.

It is an important object of this invention to improve, simplify and cheapen the regenerating operation for the recovery of the alkali values contained in the black liquors and to more effectively utilize the heat value contained therein.

It is a further important object of this invention to provide as a step in the regenerating process the dehydration of the partially concentrated black liquors to a dry form without substantial loss or destruction of the organic content of the black liquors and therefore without loss of the original heat values in the black liquors.

It is a further important object of this invention to provide a process of treating black liquors wherein the black liquors are dried in a gaseous drying medium to a fairly uniform dried product, which because of its uniformity can be more efficiently handled in the subsequent operation for the recovery of the alkali values in the black liquors.

Other and further important objects of this invention will be apparent from the disclosures in the specification and the accompanying drawings.

This invention (in a preferred form) is illustrated in the drawings and hereinafter more fully described.

My process for the treating of black liquors can best be described in connection with the accompanying drawings showing in a schematic way the various operations involved in the process and the general arrangement of the apparatus and flow of materials therethrough.

The starting material for my process is the so-called black liquors, or spent liquors, obtained in either of the alkaline processes for the manufacture of pulp, or in a modification thereof. As obtained directly from the draining of the pulp and from the wash waters, the resulting black liquor is ordinarily too dilute for immediate use in my process and is accordingly concentrated in any well-known manner, as by means of vacuum or direct heat disc evaporators, to about 35° Bé. It will be understood that this preliminary concentration of the black liquors is not essential to my process but is preferable from an economic standpoint.

According to my process, the partially concentrated black liquor is sprayed or atomized into any suitable form of dehydrating chamber 1 wherein the dehydration of the black liquor is effected through direct contact with a gaseous dehydrating medium. The temperatures of the gaseous dehydrating medium maintained within the dehydrating chamber are such as to preserve the organic content of the black liquor in a substantially unchanged condition, thereby at the same time conserving the heat value of the black liquor. Furthermore, under the temperatures employed there is no decomposition or destruction of the inorganic content of the black liquor, such as, sodium-sulphur compounds. As illustrative of the range of temperatures within the spray drier, the temperature of the entering gaseous medium may be approximately 300° F., with an upper limit say of 500° F., and a temperature of say as low as 150° F. for the exit gases.

The major portion of the dried black liquor is collected in powdered form from the bottom of the dehydrating chamber but a certain small quantity will be carried over in the exit gases and be recovered in a dust collector 2 or other type of separator. The waste gases from the separator are preferably drawn through an induced draft fan 3 and discharged through a stack 4 in any suitable manner.

From the spray drier 1 and dust collector 2, the dried, powdered black liquor, if derived from the soda process for the making of pulp, is burned, preferably in a rotary furnace, to recover the caustic alkali values in the form mainly of soda ash. If, however, the black liquor is derived from the sulphate process, the dried black liquor obtained from the spray drier and from the dust collector is charged, together with the required quantity of sodium sulphate, into a smelting furnace 5, where combustion of the dried black liquor is effected under reducing conditions to produce mainly sodium sulphide and soda ash. In either case, the heat of combustion obtained from the burning of the dried black liquor is utilized in the concentrating and dehydrating of further quantities of black liquor.

In the case of dried black liquor obtained from the sulphate process, to which my invention is particularly directed, comparatively little actual combustion of the organic content of the black liquor takes place in the smelting furnace, but the volatile organic constituents are passed from the smelting furnace 5 into a suitable device for the utilization of their heat values, as for instance a steam boiler 6, where said volatile constituents are wholly or partly burned and the heat of combustion utilized in the production of steam for use in the concentration of further quantities of black liquors.

The waste gases and products from the combustion of the volatile constituents in the steam generating plant 6 are led into the spray drier 1, where they serve as the gaseous dehydrating medium for converting further quantities of black liquors into dried, powdered form. In this way, not only is a great economy of heat values effected but also a considerable economy in the recovery of the alkali values in the black liquor, since any inorganic dust carried in the exit gases from the smelting furnace is precipitated in the spray drier or recovered in the dust collector.

The solid or semi-solid product from the smelting furnace 5 is run into a dissolving tank 7 and worked up from there on in the usual manner.

Through the use of standard regulating devices, the various operations are largely automatic, continuous, and self-contained. As compared with present methods, the greatly increased amount of heat generated by the combustion of black liquor in a completely dried condition, forms an important and distinguishing feature of my improved process. The heat derived from the partial combustion of the dried black liquors serves in the smelting furnace for the obtaining of the necessary temperatures for reduction of the sulphate to sulphide and the heat of combustion of the volatile organic constituents serves not only to furnish the steam required to evaporate the black liquor in vacuum evaporators, or the like, to the consistency required for spray drying, but also to effect the dehydration of the partially concentrated black liquors in the spray-drying process. The spray-drying, itself, is carried out at a comparatively low temperature, using the flue gases from the steam boilers at approximately the flue gas temperature common to usual steam boiler practice, thus completing by a new and improved method and to a degree not heretofore attained, the utilization of the heat available from the combustion of the organic constituents of the black liquor.

In starting up my process, the smelting furnace 5 may be heated by means of wood, oil or other fuel, in the absence of a supply of dried black liquor, in order to raise the temperature of the flue gases entering the spray drier to the desired degree.

As hereinbefore stated, the chemical commonly used to replace the loss of caustic alkali content in the recovery cycle of the sulphate process is "saltcake" (sodium sulphate), $Na_2SO_4$, which is usually added to the black ash as it falls from the rotary incinerator into the smelting furnaces. The variable consistency of the black ash obtained from the incinerator according to the common practice, however, is not conducive to maximum percentage of reduction of the sulphate to sulphide, since the black ash may and frequently does vary widely from a thick syrup containing considerable water to a glowing coal or completely burned ash, under which conditions any effective control of furnace operation is practically impossible, with the result that the reduction of the sodium sulphate is more or less incomplete and the cost of chemicals correspondingly increased. My process, on the other hand, provides for the delivery to the smelting furnace at a definite rate of a completely dried black liquor of uniform consistency and composition, containing all of the heating values of the original black liquor and under such conditions it is obvious that the operation of the smelting furnace, both in respect to the reduction of the sulphate and from the standpoint of efficient heat recovery is much improved and rendered subject to effective control.

Furthermore, under present operating conditions, owing to the difficulty of control, excessively high temperatures develop in the smelting furnaces, resulting in volatilization and consequent loss of caustic alkali values and especially of sulphur containing compounds. These high temperatures, moreover, are most destructive to smelting furnace lining. Under my process, by furnishing a method of accurate proportioning of air with a uniform combustible, these excessively high temperatures in smelting furnaces and the consequent losses are avoided, the combustion of the volatile constituents of the organic matter contained in the black liquor being maintained for the most part under the boilers instead of inside the smelting furnaces. In addition to the foregoing advantages, my process improves the working conditions by converting the black liquors into an improved physical condition, reduces labor cost as compared with the methods commonly employed in black liquor recovery plants and effects numerous other attendant economies.

It will be understood that other methods than spray drying may be employed for dehydrating the partially concentrated black liquor, as for instance, the usual types of internally heated drum or vacuum driers. One of the important features of my invention is the substantially complete dehydration of the black liquor in order to more fully utilize its heat values, which are in the neighborhood of 6,000–7,000 B. t. u. per lb., and to increase the efficiency of the reduction step in the smelting furnace used in the sulphate process.

Attention is directed to my co-pending case, Serial No. 351,660, filed April 1, 1929.

I am aware that many changes may be made and numerous details of my process may be varied through a wide range without departing from the principles of this invention, and I, therefore, do not purpose limiting the patent granted hereon otherwise than necessitated by the prior art.

I claim as my invention:

1. The process of treating black liquor, which comprises dehydrating the black liquor while suspended in a finely comminuted form in a gaseous drying medium without destroying the organic content thereof, and utilizing the heat of combustion of the thus dried material in a separate operation for dehydrating further quantities of black liquor.

2. The process of treating black liquor, which comprises partially concentrating the black liquor, spraying the partially concentrated liquor into a heated gaseous medium to form a dried powder having substantially the same organic content as the liquor, burning said powder in a separate operation and utilizing the heat obtained thereby in the subsequent dehydration of further quantities of black liquor.

3. In the process of regenerating black liquor obtained in the manufacture of pulp by the soda or sulphate process, the steps of dehydrating the black liquor in a heated gaseous medium without substantially changing its organic content and in a separate operation burning the thus formed dried material without the addition of other combustible matter.

4. The process of regenerating black liquor obtained in the manufacture of pulp by the soda or sulphate process, which comprises spraying a partially concentrated black liquor into a gaseous dehydrating medium to reduce said liquor to a substantially dry powder without substantially changing its organic content, burning the organic content in a separate and distinct operation, utilizing the gaseous products of combustion as the gaseous medium in subsequent dehydrating operations and recovering the inorganic content of said dry powder.

5. The process of regenerating black liquor obtained in the manufacture of pulp by the soda or sulphate process, which comprises spraying a partially concentrated black liquor into a gaseous dehydrating medium to reduce said liquor to a substantially dry powder without substantially changing its organic content, burning the organic content in a separate and distinct operation, utilizing the heat of combustion in the generation of steam and the gaseous products of combustion as the gaseous medium in subsequent dehydrating operations and recovering the inorganic content of said dry powder.

6. The process of regenerating black liquor from the sulphate process of making pulp, which comprises partially concentrating the black liquor, dehydrating the partially concentrated liquid to substantially dry form, without destruction of its organic content, heating the dry material under reducing conditions in a separate operation, burning the organic content of said dried material, utilizing the heat of combustion of said organic content for further dehydrating operations and recovering the inorganic content of the dried black liquor in a reduced state.

7. The process of regenerating black liquor from the sulphate process of making pulp, which comprises partially concentrating the black liquor, dehydrating the partially concentrated liquid to substantially dry form of comparatively uniform composition without destruction of its organic content, heating in a separate operation the dry material together with added sodium sulphate under reducing conditions, burning the organic content of said dried material, utilizing the heat of combustion of said organic content for further dehydrating operations and recovering the inorganic content of the dried black liquor in a reduced state and the greater portion of the added sodium sulphate in the form of sodium sulphide.

8. The process of regenerating black liquor from the sulphate process of making pulp, which comprises partially concentrating the black liquor, dehydrating the partially concentrated liquid in sprayed form in a gaseous dehydrating medium to substantially dry form of comparatively uniform composition without destruction of its organic content, heating in a separate operation the dry material together with added sodium sulphate under reducing conditions, burning the organic content of said dried material, utilizing the heat of combustion of said organic content for further concentrating operations and the gaseous products of combustion for further dehydrating operations and recovering the inorganic content of the dried black liquor in a reduced state and the greater portion of the added sodium sulphate in the form of sodium sulphide.

In testimony whereof I have hereunto subscribed my name at Chicago, Cook County, Illinois.

EDWARD G. GOODELL.